United States Patent [19]

Passemard et al.

[11] Patent Number: 4,527,945
[45] Date of Patent: Jul. 9, 1985

[54] SWIVELLING HANDLE WITH THREE AXES OF ROTATION FOR AN INDUSTRIAL ROBOT

[75] Inventors: Jean-Robert Passemard, Bailly Romainvilliers; Gaston Keledjian, Boulogne Billancourt, both of France

[73] Assignee: Regie Nationale des Usines Renault, Boulogne Billancourt, France

[21] Appl. No.: 417,851

[22] Filed: Sep. 14, 1982

[30] Foreign Application Priority Data

Sep. 15, 1981 [FR] France .................................. 81 17426

[51] Int. Cl.³ ............................................. B25J 17/02
[52] U.S. Cl. ....................................... 414/735; 901/29
[58] Field of Search ..................... 414/1, 4, 730, 732, 414/735; 901/29, 38

[56] References Cited

U.S. PATENT DOCUMENTS

| | | | |
|---|---|---|---|
| 3,033,059 | 5/1962 | Melton et al. | 901/29 X |
| 3,043,448 | 7/1962 | Melton | 901/29 X |
| 3,381,485 | 5/1968 | Crooks et al. | |
| 3,826,383 | 7/1974 | Richter | 901/29 X |
| 4,047,448 | 9/1977 | Pardo et al. | 901/29 X |
| 4,068,763 | 1/1978 | Fletcher et al. | 901/29 X |
| 4,149,278 | 4/1979 | Wiker et al. | 901/29 X |
| 4,370,091 | 1/1983 | Gagliardi | 901/29 X |

FOREIGN PATENT DOCUMENTS

| | | |
|---|---|---|
| 44548 | 1/1982 | European Pat. Off. |
| 2228598 | 1/1974 | Fed. Rep. of Germany |
| 2754609 | 6/1979 | Fed. Rep. of Germany |
| 2310842 | 12/1976 | France |
| 2315629 | 1/1977 | France |

Primary Examiner—Terrance L. Siemens
Attorney, Agent, or Firm—Oblon, Fisher, Spivak, McClelland & Maier

[57] ABSTRACT

A swivelling handle includes three reduction gear assemblies, each assuring the control of movement about the three axes of rotation. Each reduction gear assembly has a first reduction stage and a second reduction stage with coaxial drive. This arrangement makes possible great compactness. The third motor can be placed transversally, essentially in the axis of the second reduction unit. Thus a swivelling handle is obtained with three axes of rotation, with full electrical controls, in which the movements of rotation are created by three independent electric motors corresponding to each of the three axes of rotation. The unit is especially compact and adaptable to any type of industrial robot.

5 Claims, 2 Drawing Figures

SWIVELLING HANDLE WITH THREE AXES OF ROTATION FOR AN INDUSTRIAL ROBOT

BACKGROUND OF THE INVENTION

1. Field of the Invention

The present invention concerns a swivelling handle or head having three axes of rotation and intended to be mounted at the end of an electrically controlled industrial robot arm.

2. Description of the Prior Art

The industrial robots used to meet the needs of automation of the tools of production, in particular mass production, may include, depending on their configuration, a translational unit or arm having a sliding carriage. The end of the arm or of the carriage is equipped with a swivelling module or handle having three axes of rotation. The handle may be equipped with various tools making it possible to automate a large number of manufacturing and transfer operations, such as welding, cutting of parts, handling, etc.

Until now, control of the various rotational movements about the three axes of the swivelling handle was achieved by hydraulic means powered by a single power station or by electrical means including one or more electric drive motors mounted in the arm or the support carriage of the handle. Means of transmission generally including gears, drive chains or belts were thus provided between the arm and the handle. Such an arrangement causes operating play to appear between the various parts, and in particular sliding play by use of belt drives. In addition, the use of a control motor common to the handle's three axes of rotation, equipped with a single coding system and an initial position detection system also common to the three axes of rotation, is the source of practical difficulties. In particular, the handles of the prior art can not easily be replaced by handles with a different structure for modification of the tasks to be performed or adapted to robots having various architectures.

SUMMARY OF THE INVENTION

The object of the present invention is the provision of a swivelling handle with three axes of rotation (also called three degrees of freedom) for an electrically controlled industrial robot, said handle being easily interchangeable so that it can be mounted at will on any type of industrial robot, such as on a horizontal robot, a vertical robot or a gantry-type robot having a support carriage for the handle.

A further object of the invention is the provision of a swivelling handle which is compact in relation to those of the prior art.

The swivelling handle with three axes of rotation according to the invention is intended to be mounted at the end of an electrically controlled industrial robot arm. According to the invention, the swivelling handle includes three reduction gear assemblies, each equipped with an individual coding system so as to control movements around the three axes of rotation, respectively. Placement of the three independent reduction gear assemblies inside the swivelling head or handle itself makes it possible to obtain a perfectly interchangeable electrical robot handle that can be mounted on any type of robot, whether its structure be horizontal, vertical, or gantry-type.

The handle according to the invention also has, preferably, a special structure which makes it possible to achieve very great compactness. To this end, the handle includes an attachment element on the end of the robot arm and holding a first reduction assembly equipped with its coding system; an intermediate element driven in rotation around the first axis by the first reduction assembly and taking a second reduction assembly equipped with its coding system; and an end element equipped with a tool support driven in rotation around the second axis by the second reduction assembly and taking a third reduction assembly equipped with its coding system. The tool support is driven in rotation around the third axis by the third reduction assembly. The handle's first and second axes of rotation as well as the second and third axes intersect two by two. Furthermore, the three axes are contained in the same plane when the first and third axes are in line.

The output axis of the motor of each reduction gear assembly is parallel to the axis of the corresponding reduction system, which is mounted according to the axis of rotation of the movement obtained.

In addition, the motor of the second reduction gear assembly is preferably offset in relation to the axis of its reduction system, which is arranged along the second axis of rotation. The motor of the third reduction gear assembly is arranged transversally to an extension of the reduction system which is part of the second reduction gear assembly. By this arrangement it is possible to achieve an extremely compact unit, especially longitudinally in relation to the support arm, despite the constraints resulting from the use of three independent reduction units placed inside the structure of the swivelling handle. This assures, as has already been stated, the interchangeable character of the unit.

Linked to each reduction unit is an initialization detector mounted directly on the output part of each reduction system so that the measurement corresponds very precisely to the movement obtained around the respective axis of rotation.

Each reduction system preferably includes a first stage of reduction consisting of a gear train with parallel axes followed by a second stage of reduction with coaxial drive, this second stage mounted in the axis of rotation of the movement obtained by the reduction gear assembly in question.

In a preferred embodiment, the second stage of reduction consists of a differential reduction unit of the type marketed under the name "Harmonic Drive," making it possible to achieve significant reduction ratios with a reduced-volume mechanical unit that is low in weight, further assuring high output and very low angular play.

The association of a first stage of reduction equipped with a gear train to such a second stage of reduction thus makes it possible to combine the advantageous results of the coaxial-drive differential reduction units known by the name "Harmonic Drive" with the need for setting off the output axes of the various motors in relation to the axes of rotation of the handle.

The reduction units known by the name "Harmonic Drive" include a strain generator that is nothing more than an elliptical bearing consisting of an inner elliptical ring, a ball-cage, and an outer flexible ring. The outer flexible ring is equipped with a crown gear with outside teeth, and it undergoes the strain created by the rotation of the elliptical bearing. A rigid crown toothed on the inside having teeth with characteristics the same as those of the flexible outer crown gear and with a greater number of teeth, generally by two teeth, engages onto a portion of the outer teeth of these two elements always remaining in contact. Extremely high reduction ratios are thus obtained.

In order to assure the transmission of strong torque despite an execution of very small dimensions along its axis of rotation, a second rigid crown with inside teeth having teeth with the same characteristics as the teeth on the flexible outer ring and the same number of teeth may be added to these reduction units. A second elliptical bearing may likewise be added, thus increasing the unit's load capacity.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
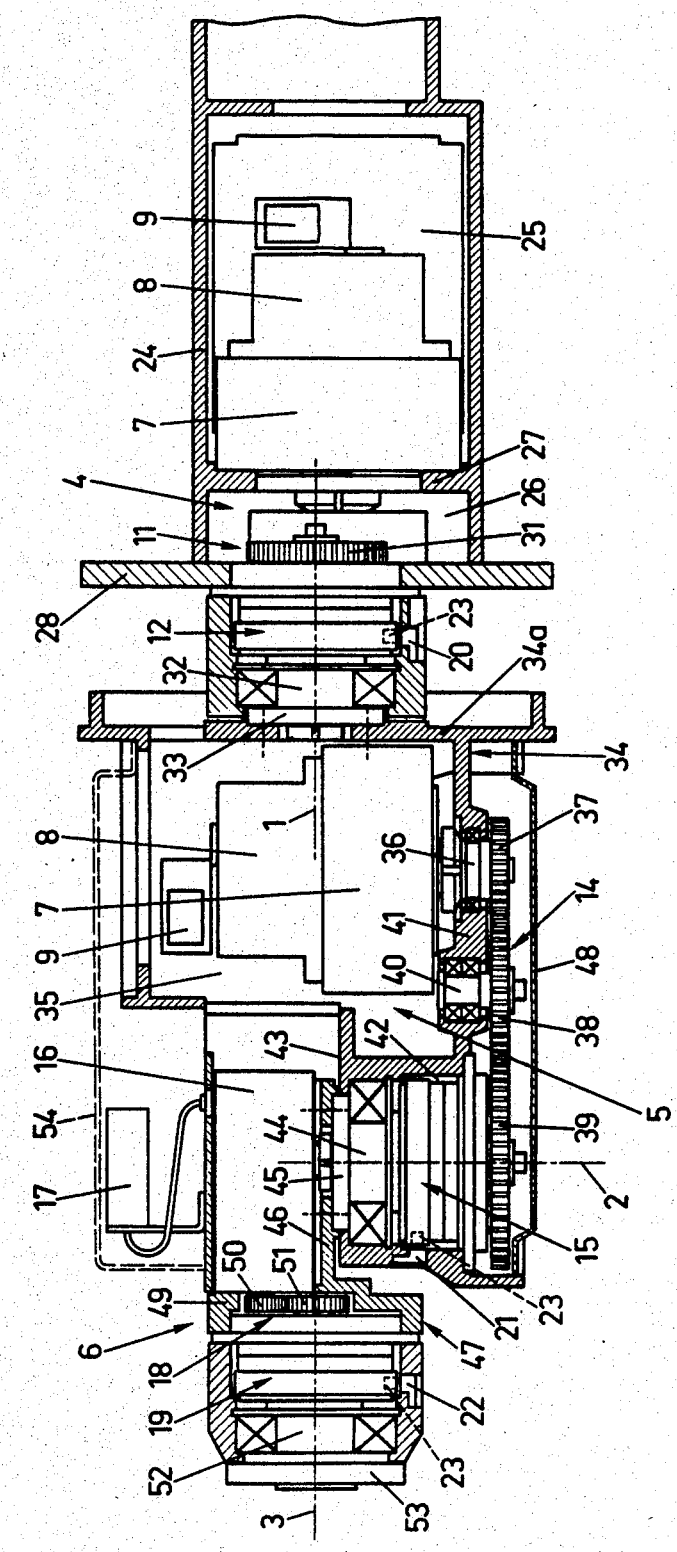
FIG. 1 is a diagrammatic view in partial cross-section of a swivelling handle with three axes of rotation according to the present invention.
Figure 2:
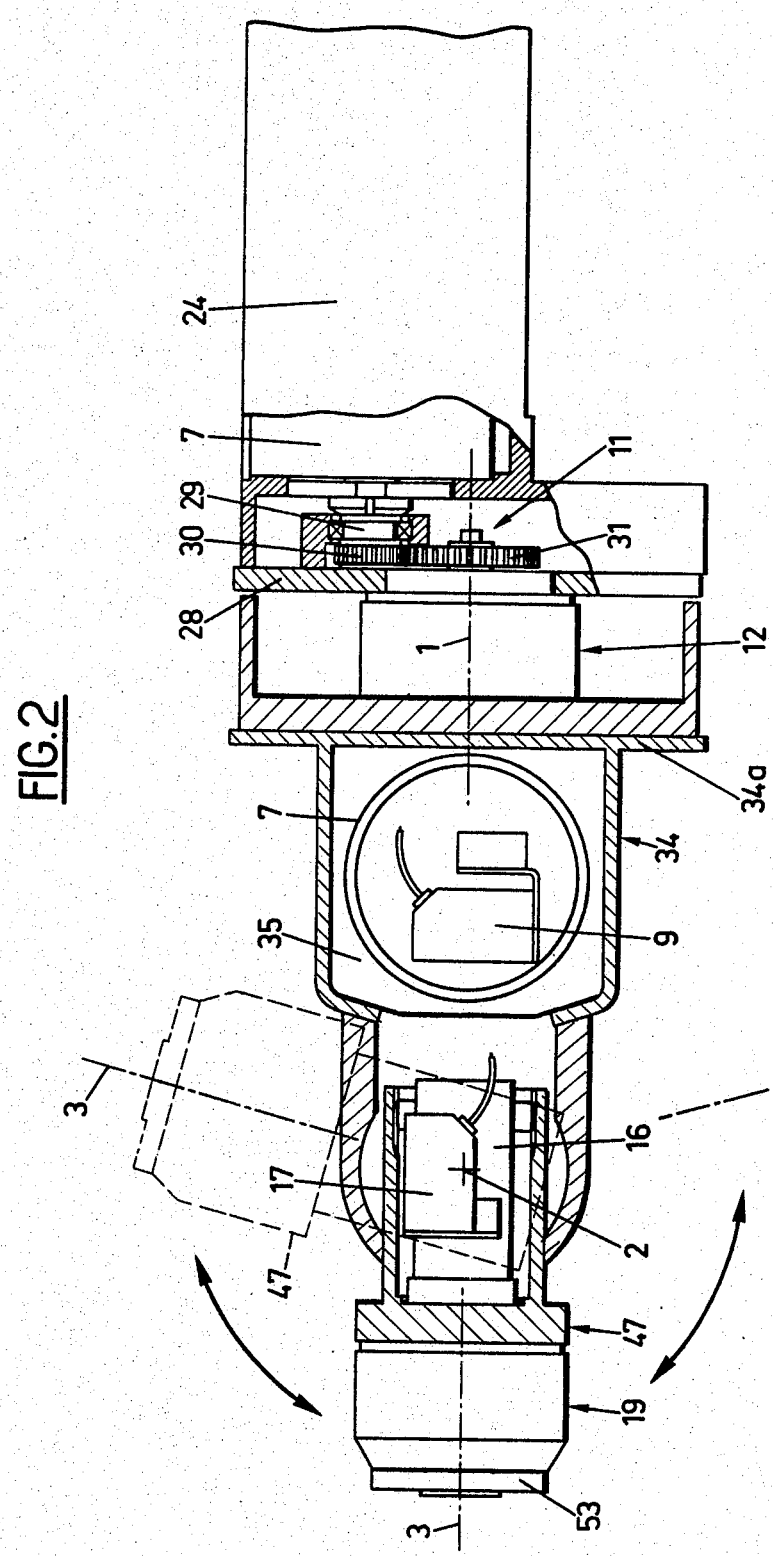
FIG. 2 is a plan view in partial cross-section of the handle in FIG. 1.

As is shown in the Figures, the swivelling handle of the invention includes a first axis of rotation 1, a second axis of rotation 2, and a third axis of rotation 3, which constitute the three axes making it possible to define the various movements desired during operation of the industrial robot equipped with said handle. In the position shown in continuous lines in FIGS. 1 and 2, the three axes 1, 2 and 3 are contained in the same plane, which is that of FIG. 1, with axes 1 and 3 being aligned. In the position shown in the dashed line in FIG. 2, the three axes intersect two by two. That is, the axes 1 and 2, on the one hand, and 2 and 3, on the other, intersect, as can be seen in FIG. 2. The same is true for the axes 1 and 3.

The rotation movements around each of these three axes 1, 2 and 3 are created by three reduction gear assemblies, identified respectively by 4, 5 and 6. The first reduction gear assembly 4 creating rotation around the axis 1 has an electric motor 7, with low axial bulk, connected to a coder system 8 and run on direct current by a multispindle connector 9. The electric motor 7 is advantageously a permanent-magnet DC motor having very low bulk with good torque characteristics according to the rotation speed. The reduction gear assembly 4 is complemented by a reduction unit having a first stage of reduction 11 and a second stage of reduction 12.

The second reduction gear assembly 5 has the same types of elements as the first reduction gear assembly 4. Indeed the electric motor 7 is connected to its coder 8 and receives an electric supply current through the connector 9. The associated reduction system includes a first stage of reduction 14 and also shows a second stage 15 with the same structure as the preceding second stage 12.

The third reduction gear assembly 6 includes a permanent-magnet DC electric motor 16 equipped with an integrated coding system and run by direct current through the connector 17. The associated reduction unit includes, as previously, a first stage 18 connected to a second stage 19.

Each reduction gear assembly further includes an initialization detector making it possible to know the status of each rotation movement at the start of the cycle. In FIG. 1 are seen the initialization detectors 20, 21 and 22 which cooperate each time with a magnet 23 fixed to the output shaft of the second stage of reduction 12, 15 and 19 of each respective reduction gear assembly 4, 5 and 6.

It can thus be seen that the swivelling handle with three axes of rotation 1, 2 and 3 according to the invention is electrically controlled and utilizes for each movement of rotation around the various axes an independent control assembly, each including an electric motor mounted in the handle itself.

The invention's handle has a housing or attachment element 24 which can be fixed to the end of an industrial robot arm (not shown in these figures). This attachment element, generally cylindrical in shape, has a first seating 25 inside of which is mounted the electric motor 7, its coding system 8 and the supply connector 9.

The element 24 also has a second seating 26, delimited on the one hand by a wall 27 which allows attachment of the motor 7, and on the other by a closure plate 28 which supports the two stages 11 and 12 of the reduction system which receives the output torque from the motor 7 transmitted by the output shaft 29 (FIG. 2). As can be noted in FIG. 2, the pinion 30 fixed to the output shaft 29 engages the driven pinion 31 constituting the input of the second stage of reduction 12 and mounted, as can be seen in FIG. 2, along the first axis of rotation 1.

The output shaft 32 of the second stage of reduction 12 is fixed by the flange 33 to a housing or intermediate element 34. This attachment is achieved by a disk-shaped portion 34a coaxial with the first axis of rotation 1. Under these conditions, the movement of rotation around the axis 1 created by the electric motor 7 and transmitted by the two reduction stages 11 and 12 results in the rotation of the intermediate housing element 34 around the axis 1.

The intermediate element 34 has a first seating 35 which receives the second motor 7, its coder 8 and its connector 9. The output shaft 36 bears an output pinion 37 cooperating with an intermediate pinion 38, the axis 40 of which is parallel to the output shaft 36. The intermediate pinion 38 engages the driven pinion 39 constituting the input of the second stage of reduction 15.

The output shaft 36 as well as the shaft 40 of the intermediate pinion 38 and the input shaft of the second stage of reduction 15 are mounted on a wall 41 of the intermediate element 34. The second reduction stage 15 is mounted in a second seating 42 of the intermediate element 34 ehich is delimited by a plane face 43. As can be seen in FIG. 1, the two reduction stages of the second reduction gear assembly 4 are entirely arranged on one side of the first axis of rotation 1. In contrast, the motor 7, its coder 8 and the supply connector 9 of the assembly 4 occupy the entire seating 35 on each side of the axis of rotation 1.

The motor of the second reduction gear assembly 5 drives in rotation the output shaft 44 of the reduction stage 15, which is fixed to the drive flange 45. The flange 45 is attached on one face 46 of an end housing element 47.

Under these conditions, the control of the motor 7 of the second reduction gear assembly 5 rotates the end element 47 around the second axis 2. The maximum clearance of this angular movement in one of the directions is shown in dashed lines in FIG. 2. The various pinions 37, 38 and 39 are protected by a closing cap 48 placed essentially parallel to the wall 41.

The motor 16 of the third reduction gear assembly 6 is mounted on a seating portion 49 of disk shape coaxial to the third axis of rotation 3 and forming a part of the end element 47. The output pinion 50 of the motor 16 engages the input pinion 51 of the second reduction stage 19. The pinion 51 is coaxial to the third axis of rotation 3 and the second reduction stage 19. The output shaft 52 of the second stage of reduction 19 is fixed to a flange 53 playing the role of tool support for a tool (not shown in the Figures).

The drive of the motor 16 thus causes a rotation around the third axis 3 of the tool support 53 and of the tool attached thereto.

A closure cap 54 attached to the intermediate element 34 protects the connector 17 of the motor 16.

As can be seen in FIG. 1, the motor 16 is mounted above and outside the wall 43 in the site left free above the axis of rotation 1 by the seating 42 of the intermediate housing element 34. The structure of the electric motor 16 is such that it has a relatively elongated form with a small diameter which makes it possible to house said motor 16 in this free site. The portion of the end element 47 which receives the motor 16 is thus on the other side of the seating 42, in relation to the axis of rotation 1, receiving the second reduction stage 15. This arrangement is made possible by in particular by the fact that the output shaft 36 of the motor 7 of the unit 5 is arranged to be offset and parallel in relation to the axis of rotation 2, taking into account the existence of the first reduction stage 14 consisting of the three pinions 37, 38 and 39. Likewise, the offset between the rotation shaft of the first motor 7 and the first axis of rotation 1 as well as the offset between the output shaft of the motor 16 and the third axis of rotation 4 make it possible to have these different motors inside the seatings of the various housing elements 24, 34, 47 while increasing the compactness of the handle in all its dimensions.

In addition, it will be noted that in the embodiment illustrated, the drive motors 7 of the axes of rotation 1 and 2 are identical, as are their coder 8 and their multi-spindle connector 9, which naturally simplifies maintenance of the unit and reduces manufacturing costs by increasing standardization. This is also true for the three coaxial-drive reduction stage 12, 15 and 19. It will be noted that these differential reduction units, which have been shown from an outside view in the figures, are of the type known and marketed under the name "Harmonic Drive."

Hence these are reduction units having a very great reduction ratio for a low weight, with high output and low angular play. In addition, these reduction units make it possible to transmit high rotation torques. The three initialization detectors 20, 21 and 22 are identical and are mounted so as to cooperate directly with the output part of the second reduction stage in question. Thus extremely precise information is obtained on the exact angular position according to each of the three axes of rotation 1, 2 and 3.

Finally, a swivelling handle with three axes or with three degrees of freedom is obtained, easily interchangeable, very compact, at a low cost and with great control precision over the rotation movements.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A swivelling handle for a robot arm, comprising:
   an attachment element adapted to be connected to an end of a robot arm;
   a first reduction gear assembly mounted in said attachment element and having an output shaft defining a first axis of movement;
   a first motor and a first coding system mounted in said attachment element for driving said first reduction gear assembly, said first motor having an output shaft parallel to said first axis;
   an intermediate element rotatably driven about said first axis by said first reduction gear assembly output shaft;
   a second reduction gear assembly mounted in said intermediate element and having an output shaft defining a second axis of movement;
   a second motor and a second coding system mounted in said intermediate element for driving said second reduction gear assembly, said second motor having an output shaft parallel to said second axis;
   an end element rotatably driven about said second axis by said second reduction gear assembly output shaft;
   a third reduction gear assembly mounted in said end element and having an output shaft defining a third axis of said movement;
   a third motor and a third coding system mounted in said end element for driving said third reduction gear assembly, said third motor having an output shaft parallel to said third axis, wherein said second axis intersects said third motor and said third motor is positioned opposite said second reduction gear assembly with respect to a plane containing said first axis and extending orthogonal to said second axis; and
   a tool support rotatably driven about said third axis by said third reduction gear assembly output shaft,
   wherein each of said reduction gear assemblies comprises a first reduction stage engaged with a respective motor output shaft and including a gear train with parallel axes, and a second reduction stage mounted along the respective output shaft axis of said reduction gear assembly,
   wherein said second axis intersects both said first and third axes, and wherein said first, second and third axes are coplanar when said first and third axes are colinear.

2. The handle of claim 1 wherein said output shaft of said second motor is not colinear with said second axis, and wherein said output shaft of said third motor extends transverse to said second axis.

3. The handle of claims 1 or 2 including means for detecting the initial position of each of said reduction gear assembly output shafts.

4. The handle of claim 1 wherein each of said second reduction stages is of the type having at least one elliptical bearing consisting of an inner elliptical ring, a ball-cage and a flexible outer ring, with teeth on the aforementioned flexible outer ring, and a first rigid inner toothed crown having teeth with the same characteristics as the teeth on the flexible outer ring but with a greater number of teeth.

5. The handle of claim 4 wherein each of said second reduction stages also has a rigid second crown with teeth on the inside, said inside teeth having the same characteristics as the teeth on the flexible outer ring and the same number of teeth.

* * * * *